UNITED STATES PATENT OFFICE 2,634,302

ISOPROPENYLBIPHENYL

Raymond B. Seymour, Mertztown, Pa., and David T. Mowry, Dayton, Ohio, assignors to Monsanto Chemical Company, St. Louis, Mo., a corporation of Delaware No Drawing. Application December 6, 1949, Serial No. 131,489

3 Claims. (Cl. 260—669)

The present invention provides para- and meta-isopropenylbiphenyl.

The present compounds have the following structure:

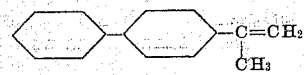

and

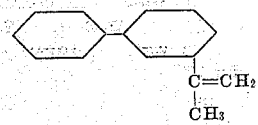

We have found that these compounds may be prepared by reaction of the meta-, or para-phenylacetophenone with a methyl magnesium halide to yield the correspondingly isomeric alpha,alpha - dimethyl(phenylbenzyl) alcohols followed by the catalytic dehydration of the latter to the respective isopropenylbiphenyls. This preparation is illustrated by the following reactions showing the synthesis of the para-isomer:

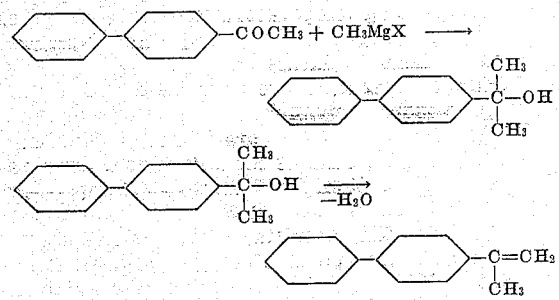

wherein X represents halogen.

The para- and meta-isopropenylbiphenyls may also be readily prepared by reaction of biphenylmagnesium halides with acetone for the production of the alpha,alpha-dimethyl(phenylbenzyl) alcohols followed by dehydration of the latter. These reactions are also illustrated with respect to the para-isomer.

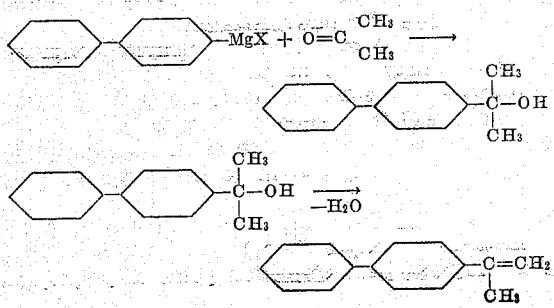

In order to prevent cyclization or other undesirable side reactions, we have found it desirable to carry out the dehydration of the carbinols in the vapor phase and in the presence of a catalyst providing an extended surface. Various metal oxides, phosphates, sulfates or non-reactive carbides are of general utility and particularly alumina, aluminum phosphate, aluminum silicate, silica, potassium or sodium bisulfate, calcium sulfate, calcium phosphate, boron carbide, or aluminum carbide may be used. Temperatures should be above 225° C. and preferably in the neighborhood of 250° C. to 320° C.

As far as we have been able to ascertain, the para- and meta-isopropenylbiphenyls have not been hitherto prepared.

Our new ispropenylbiphenyls are unsaturated materials which are stable under ordinary atmospheric conditions and do not polymerize even when heated for several weeks at temperatures above 100° C. When mixed with at least one other polymerizable substance having ethylenic unsaturation, they readily undergo copolymerization. Styrene, methyl methacrylate, acrylonitrile, or butadiene or mixtures thereof have been found to give resinous or rubbery copolymers which are particularly characterized by a greatly increased stability to heat. Copolymers of the para- and meta-isopropenylbiphenyls with styrene are disclosed and claimed in our copending application Serial No. 72,747, filed January 25, 1949, now abandoned. Copolymers of the para- and meta-isopropenylbiphenyl with hydrocarbon dienes are disclosed and claimed in our copending application Serial No. 72,746, filed January 25, 1949, now U. S. Patent 2,544,393 issued March 6, 1951.

The invention is further illustrated, but not limited, by the following examples:

EXAMPLE 1

This example shows the preparation of para-isopropenylbiphenyl.

$\alpha,\alpha$-dimethyl-para-phenylbenzyl alcohol was prepared as follows: Methylmagnesium bromide was prepared by passing methyl bromide into 1200 ml. of ether containing 2 gram moles of magnesium. To the resulting ether solution, admixed with 1880 ml. of benzene, there was then slowly added with stirring 371 g. (1.84 mols) of para-actylibiphenyl during a period of approximately one hour. The addition was effected at room temperature. The resulting reaction mixture was then allowed to stand overnight, hydrolyzed with water, and then with dilute sulfuric acid. The ether layer was separated, divided into two portions, and each portion was washed three times with a total of 750 ml. of water for each portion. The ether was driven off by distillation in a Vigreux column under partial vacuum, and the residue was then taken up with hexane, transferred into a beaker and gently heated in order to remove excess of hexane. Within 24 hours the product crystallized from the hexane. Upon filtering and drying there was obtained 330 g. (85% yield) of the crude material, which upon recrystallization from a benzene-hexane mixture gave 281 g. of light yellow crystals which melted at 79–87° C. Three subsequent recrystallizations gave the substantially pure $\alpha,\alpha$-dimethyl-para-phenylbenzyl alcohol, M. P. 91.5° C.–92.8° C., analyzing as follows:

|  | Percent C | Percent H |
|---|---|---|
| Calcd. for $C_{15}H_{16}O$ | 84.86 | 7.60 |
| Found | 84.84 | 7.78 |

Dehydration of $\alpha,\alpha$-dimethyl-para-phenylbenzyl alcohol to para-isopropenylbiphenyl was effected as follows: 280 g. of the carbinol was dissolved in dioxane so as to make up a 30% solution. This was added dropwise, over a period of 5 to 6 hours, into a silica tube having an internal diameter of 0.875" and filled to a depth of 24" with activated alumina. The reaction temperture was 250° C. to 275° C. and a total pressure of from 20 to 40 mm. was maintained in the reaction tube during addition of the alcohol. After addition had been completed, the column was washed out with dioxane, the washings were combined with the condensate, and the whole was distilled in a small Vigreux column under oil-pump vacuum. Almost the entire product boiled at 140° C. at 4.5 mm. There was obtained 142 g. (79% yield) of substantially pure para-isopropenylbiphenyl which, when recrystallized from alcohol, had a melting point of 117.0° C. to 117.8° C. Determination of unsaturation by the bromide-bromate method (Francis, Ind. Eng. Chem. 18, 821-3 (1926)) showed 100.1% unsaturation, and the product analyzed as follows:

|  | Percent C | Percent H |
|---|---|---|
| Calcd. for $C_{15}H_{14}$ | 92.73 | 7.26 |
| Found | 92.89 | 7.25 |

EXAMPLE 2

This example describes the preparation of meta-isopropenylbiphenyl.

The Grignard reagent was prepared from 150 g. of meta-bromobiphenyl (0.64 mole) in the usual fashion and treated with a 20% excess of dry acetone in ether. After standing overnight, the material was hydrolyzed with dilute hydrochloric acid, separated, washed with water and evaporated to give 124 g. (92%) of crude, oily dimethyl-meta-xenylcarbinol which could not be purified by crystallization or distillation.

Two hundred forty-three grams of this crude product was refluxed with an excess (280 g.) of acetic anhydride for three hours. The acetic acid and excess anhydride were removed under vacuum and the product fractionated to give 29 g. biphenyl and 141 g. of meta-isopropenylbiphenyl, B. P. 160° C. to 161° C. at 11 mm. $n_D^{25}$ 1.6128. A bromide-bromate titration indicated a purity of 99.6%.

Anal. Calcd. for $C_{15}H_{14}$: C, 92.72; H, 7.26. Found: C, 92.23; H, 7.50

Dehydration of the $\alpha,\alpha$-dimethyl(phenylbenzyl) alcohols may be carried out upon other types of catalysts than the activated alumina used above. Generally, inert masses of large surface are preferred and particularly silica, silica gel, minerals or glass fragments may be employed. Metals should be avoided. Temperatures should be above 250° C. and below temperatures at which thermal cracking takes place. Temperatures ranging from 275° C. to 320° C. are preferred and have been found to give good yields of the isopropenylbiphenyls. However, the temperature may range upwardly to 600° C. or 625° C. Moreover, the dehydration reaction may be carried out in the presence of a diluent such as water vapor, nitrogen or carbon dioxide.

If, for purposes of dehydration, a solution of the alcohol is employed, the solvent should be one which does not undergo decomposition at the reaction temperature. However, a solvent need not be employed. For example, the carbinol may be vaporized in a pre-heater, and the vapors passed therefrom over and through the dehydrating catalyst. Good results are also obtained by flashing the carbinol into vapor by dropping upon a heated surface, in such a manner that flash evaporation thereof takes place at pressures below atmospheric. In either the presence or absence of a solvent, optimum conditions for the vapor phase dehydration comprise pressures of below atmospheric and preferably pressures of from 50 mm. to 375 mm. pressure absolute, i. e., from $\frac{1}{15}$ to about $\frac{1}{2}$ of an atmosphere.

Mixtures of the isomeric isopropenylbiphenyls in any proportions may be prepared by dehydrating suitable mixtures of the carbinols.

We are aware that the isomeric ortho-isopropenylbiphenyl has been prepared and described by Bradsher and Amore in JACS, 65, 2016 (1943).

We have prepared ortho-isopropenylbiphenyl and have attempted to form copolymers thereof with styrene. We have heated mixtures consisting of styrene and ortho-isopropenylbiphenyl to polymerizing temperatures and have recovered the ortho-isopropenylbiphenyl unpolymerized from the heated mixture.

On the other hand we have heated a mixture of para-isopropenylbiphenyl and styrene containing 40 parts of the para-isopropenylbiphenyl and 60 parts of styrene for 6 days at a temperature of 70° C., then for 7 days at a temperature of 100° C. and then for 2 days at a temperature of 125° C. The resulting hard, colorless resin had a softening point of 145° C. and a melting point of 209° C. A determination of the alcohol-soluble content of this resin showed only 4.8% alcohol-soluble material, indicating that substantially all of the para-isopropenylbiphenyl had copolymerized with the styrene.

A mixture of ortho-isopropenylbiphenyl and styrene (60–40) which was heated for 21 days at a temperature of 125° C., and hence under much more severe polymerizing conditions than employed above was examined similarly and showed no evidence of copolymerization.

Copolymers of meta-isopropenylbiphenyl and styrene may also be prepared, since we have found that the meta-isomer, similar to the para-isomer, will form copolymers with styrene. The degree of heat and length of the heating period required is quite similar to that employed with the para-isomer.

Both the part-isopropenylbiphenyl and the meta-isopropenylbiphenyl possess the property of raising the heat distortion point of polystyrene when copolymerized therewith. The following heat distortion values were obtained using the standard ASTM air-bath heat distortion test and applied to copolymers prepared, respectively, from 40 parts of para- and meta-isopropenylbiphenyl and 60 parts of styrene.

*ASTM air-bath*

| Copolymer from— | Heat Distortion, °C. |
|---|---|
| 40 para-isopropenylbiphenyl<br>60 styrene | 109.1 |
| 40 meta-isopropenylbiphenyl<br>60 styrene | 96.5 |

In comparison the heat distortion point of polystyrene determined by the same test is 85° C.

This application is a continuation-in-part of our application filed August 26, 1947, Serial No. 770,758, now abandoned, which in turn is a continuation-in-part of our application filed January 20, 1945, Serial No. 573,811, now abandoned, and which are assigned to the same assignee as the present case.

What we claim is:

1. An isopropenylbiphenyl selected from the class consisting of para-isopropenylbiphenyl and meta-isopropenylbiphenyl.
2. Para-isopropenylbiphenyl.
3. Meta-isopropenylbiphenyl.

RAYMOND B. SEYMOUR.
DAVID T. MOWRY.

REFERENCES CITED

The following references are of record in the file of this patent:

Bradsher et al., "Aromatic Cyclodehydration, XIV 9, 10, Dialkylphenanthrenes," J. A. C. S., vol. 65, pp. 2016–7 (Oct. 1943).